United States Patent
Fu et al.

(10) Patent No.: US 10,482,276 B2
(45) Date of Patent: Nov. 19, 2019

(54) USER PERMISSION ALLOCATION METHOD AND DEVICE

(71) Applicant: Huawei Technologies Co., Ltd., Shenzhen (CN)

(72) Inventors: Jiali Fu, Shenzhen (CN); He Wei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 180 days.

(21) Appl. No.: 15/352,104

(22) Filed: Nov. 15, 2016

(65) Prior Publication Data

US 2017/0061150 A1 Mar. 2, 2017

Related U.S. Application Data

(63) Continuation of application No. PCT/CN2015/073520, filed on Mar. 2, 2015.

(30) Foreign Application Priority Data

May 15, 2014 (CN) .......................... 2014 1 0205397

(51) Int. Cl.
  *G06F 21/62* (2013.01)
  *G06K 9/00* (2006.01)
  (Continued)

(52) U.S. Cl.
  CPC ........ *G06F 21/6218* (2013.01); *G06F 16/436* (2019.01); *G06F 21/32* (2013.01); *G06K 9/00288* (2013.01); *H04L 63/0861* (2013.01)

(58) Field of Classification Search
  CPC ..... H04L 63/0861; G06F 21/32; G06F 21/45; G06F 21/6218; G06K 9/00288
  See application file for complete search history.

(56) References Cited

U.S. PATENT DOCUMENTS 6,655,585 B2 * 12/2003 Shinn .................. G06K 9/00
                                                     235/382
8,559,684 B1 10/2013 Nechyba
                   (Continued)

FOREIGN PATENT DOCUMENTS

CN       1860490 A     11/2006
CN     101026685 A     8/2007
               (Continued)

OTHER PUBLICATIONS

Machine Translation and Abstract of Chinese Publication No. CN103747346, Apr. 23, 2014, 5 pages.
(Continued)

*Primary Examiner* — Sher A Khan
(74) *Attorney, Agent, or Firm* — Conley Rose, P.C.

(57) ABSTRACT

A user permission allocation method includes acquiring currently collected facial feature information of a user; determining a difference degree of the current facial feature information of the user according to the acquired facial feature information of the user and facial feature information included in stored standard sample information; and allocating a user permission to the user according to the determined difference degree. Compared with a manner of using a fixed face threshold, a difference degree of current facial feature information of the user is determined, and when a user permission is allocated to the user, an external factor that affects the collected facial feature information is used as a reference factor, which means that a higher difference degree of the collected facial feature information indicates a lower user permission allocated to the user, so that the user permission of the user is dynamically allocated.

11 Claims, 3 Drawing Sheets

(51) Int. Cl.
*H04L 29/06* (2006.01)
*G06F 21/32* (2013.01)
*G06F 16/435* (2019.01)

(56) References Cited

U.S. PATENT DOCUMENTS

| | | | | |
|---|---|---|---|---|
| 2003/0115473 | A1* | 6/2003 | Sugimura | G06F 21/32 |
| | | | | 713/186 |
| 2004/0164848 | A1* | 8/2004 | Hwang | G06F 21/32 |
| | | | | 340/5.82 |
| 2006/0251292 | A1* | 11/2006 | Gokturk | G06F 17/30253 |
| | | | | 382/103 |
| 2007/0241861 | A1* | 10/2007 | Venkatanna | G06F 21/32 |
| | | | | 340/5.52 |
| 2008/0037833 | A1* | 2/2008 | Takahashi | G06F 21/32 |
| | | | | 382/115 |
| 2009/0060293 | A1* | 3/2009 | Nagao | G06F 21/32 |
| | | | | 382/118 |
| 2010/0316265 | A1 | 12/2010 | Nakanowatari et al. | |
| 2012/0076422 | A1* | 3/2012 | Yang | G06K 9/6211 |
| | | | | 382/201 |
| 2012/0326841 | A1* | 12/2012 | Aoki | G06F 21/32 |
| | | | | 340/5.82 |
| 2013/0067546 | A1* | 3/2013 | Thavasi | G06F 21/31 |
| | | | | 726/7 |
| 2013/0247175 | A1* | 9/2013 | Nechyba | G06F 21/32 |
| | | | | 726/19 |
| 2014/0050373 | A1* | 2/2014 | Kiyosawa | G06K 9/00268 |
| | | | | 382/118 |
| 2014/0172707 | A1* | 6/2014 | Kuntagod | G06Q 20/40145 |
| | | | | 705/44 |
| 2014/0230033 | A1* | 8/2014 | Duncan | G06F 21/32 |
| | | | | 726/7 |
| 2014/0380446 | A1* | 12/2014 | Niu | G06F 21/32 |
| | | | | 726/7 |

FOREIGN PATENT DOCUMENTS

| | | |
|---|---|---|
| CN | 101256628 A | 9/2008 |
| CN | 101847187 A | 9/2010 |
| CN | 103324909 A | 9/2013 |
| CN | 103440446 A | 12/2013 |
| CN | 103747346 A | 4/2014 |
| CN | 103995997 A | 8/2014 |
| EP | 2698742 A2 | 2/2014 |
| JP | 2010176304 A | 8/2010 |
| WO | 2009008077 A1 | 1/2009 |

OTHER PUBLICATIONS

Machine Translation and Abstract of Chinese Publication No. CN103995997, Aug. 20, 2014, 5 pages.
Machine Translation and Abstract of Chinese Publication No. CN103440446, Dec. 11, 2013, 5 pages.
Machine Translation and Abstract of Japanese Publication No. JP2010176304, Aug. 12, 2010, 16 pages.
Foreign Communication From A Counterpart Application, European Application No. 15793605.5, Extended European Search Report dated Dec. 21, 2016, 7 pages.
Foreign Communication From A Counterpart Application, Chinese Application No. 201410205397.8, Chinese Office Action dated May 20, 2016, 7 pages.
Foreign Communication From A Counterpart Application, Chinese Application No. 201410205397.8, Chinese Office Action dated Jan. 11, 2017, 7 pages.
Foreign Communication From A Counterpart Application, PCT Application No. PCT/CN2015/073520, English Translation of International Search Report dated May 13, 2015, 2 pages.
Foreign Communication From A Counterpart Application, PCT Application No. PCT/CN2015/073520, English Translation of Written Opinion dated May 13, 2015, 8 pages.

* cited by examiner

USER PERMISSION ALLOCATION METHOD AND DEVICE

CROSS-REFERENCE TO RELATED APPLICATIONS

This application is a continuation of International Patent Application No. PCT/CN2015/073520, filed on Mar. 2, 2015, which claims priority to Chinese Patent Application No. 201410205397.8, filed on May 15, 2014. The disclosures of the aforementioned applications are hereby incorporated by reference in their entireties.

TECHNICAL FIELD

The present disclosure relates to the field of information security technologies, and in particular, to a user permission allocation method and device based on facial recognition.

BACKGROUND

With the development of computer networks and communications technologies, problems such as network information security, intellectual property rights protection, and identity authentication become important and urgent research subjects.

Identity authentication is a prerequisite for ensuring system security, and in multiple different security technology fields, accurate identity authentication information is required. Conventional identity authentication methods such as an identity card, a smart card, and a password have many problems, for example, the identity card and the smart card are inconvenient to carry, easily lost, or unreadable, or the password is easy to be cracked.

An identity authentication method based on a facial recognition technology overcomes defects of the conventional identity authentication method, has high security, reliability, and effectiveness, draws increasingly more attention of people, and gradually enters various fields of social lives.

However, as wireless Internet technologies and smartphone devices are widely used, the facial recognition technology also faces increasing challenges. In an unreliable collection environment, collected facial information changes constantly, which increases a recognition difficulty of the facial recognition technology. Based on a current technology of authenticating collected facial information according to an authentication threshold, a difficulty of setting the authentication threshold increases with an increase of an amount of the collected facial information. However, the authentication threshold is directly related to an authentication error rate. When a selected authentication threshold is excessively small, the authentication error rate is increased, and therefore, authentication security is reduced; and when the selected authentication threshold is excessively large, the authentication error rate is reduced, but authentication efficiency is also reduced.

It can be seen that, a problem of balancing the authentication threshold becomes a key problem that cannot be neglected in a facial authentication technology, which also means that how to improve authentication efficiency of the facial authentication technology and ensure authentication security become a problem that needs to be resolved urgently.

SUMMARY

Embodiments of the present disclosure provide a user permission allocation method and device, which are used for resolving a problem that a current facial recognition technology has low authentication efficiency or low authentication security.

According to a first aspect of the present disclosure, a user permission allocation method is provided, including acquiring currently collected facial feature information of a user; determining a difference degree of the current facial feature information of the user according to the acquired facial feature information of the user and facial feature information included in stored standard sample information; and allocating a user permission to the user according to the determined difference degree.

With reference to a possible implementation manner of the first aspect of the present disclosure, in a first possible implementation manner, the allocating a user permission to the user according to the determined difference degree includes adjusting, according to the determined difference degree, a matching threshold corresponding to the standard sample information, and determining a matching degree of the collected facial feature information of the user according to a matching threshold obtained after adjustment; and allocating the user permission to the user according to the matching degree.

With reference to the first possible implementation manner of the first aspect of the present disclosure, in a second possible implementation manner, the adjusting, according to the determined difference degree, a matching threshold corresponding to the standard sample information includes comparing the difference degree with a preset difference threshold; and decreasing the matching threshold corresponding to the standard sample information when the difference degree is greater than the preset difference threshold; keeping the matching threshold corresponding to the standard sample information unchanged when the difference degree is equal to the preset difference threshold; or increasing the matching threshold corresponding to the standard sample information or keeping the matching threshold unchanged when the difference degree is less than the preset difference threshold.

With reference to the second possible implementation manner of the first aspect of the present disclosure, in a third possible implementation manner, the decreasing the matching threshold corresponding to the standard sample information when the difference degree is greater than the preset difference threshold includes calculating a difference between the difference degree and the preset difference threshold; determining, according to a preset correspondence between a difference and an adjustment amplitude of a matching threshold, an adjustment amplitude of the matching threshold corresponding to the calculated difference; and decreasing the matching threshold corresponding to the standard sample information by the determined adjustment amplitude.

With reference to the second possible implementation manner of the first aspect of the present disclosure, in a fourth possible implementation manner, increasing, when the difference degree is less than the preset difference threshold, the matching threshold corresponding to the standard sample information includes calculating an absolute value of a difference between the difference threshold and the preset difference threshold; determining, according to a preset correspondence between an absolute value of a difference and an adjustment amplitude of a matching threshold, an adjustment amplitude of the matching threshold corresponding to the calculated absolute value of the difference; and increasing the matching threshold corresponding to the standard sample information by the determined adjustment amplitude.

With reference to the second possible implementation manner of the first aspect of the present disclosure, the third possible implementation manner of the first aspect of the present disclosure, or the fourth possible implementation manner of the first aspect of the present disclosure, in a fifth possible implementation manner, determining a matching degree of the collected facial feature information of the user according to a matching threshold obtained after adjustment includes determining, according to a preset correspondence between a matching threshold and a matching degree of facial feature information, a matching degree, which corresponds to the matching threshold obtained after adjustment, of the facial feature information as the matching degree of the collected facial feature information of the user.

With reference to the fifth possible implementation manner of the first aspect of the present disclosure, in a sixth possible implementation manner, allocating the user permission to the user according to the matching degree includes determining, according to a preset correspondence between a matching degree and a user permission, an obtained user permission corresponding to the matching degree of the collected facial feature information of the user; and allocating the determined user permission to the user, where a higher matching degree indicates more user permissions allocated to the user, and a lower matching degree indicates fewer user permissions allocated to the user.

With reference to the possible implementation manner of the first aspect of the present disclosure, in a seventh possible implementation manner, information about the user permission includes a validity period of the user permission; and the allocating the determined user permission to the user includes allocating a determined validity period of the user permission to the user, where more user permissions allocated to the user indicate a longer validity period of the user permissions, and fewer user permissions allocated to the user indicate a shorter validity period of the user permissions.

With reference to the possible implementation manner of the first aspect of the present disclosure, in an eighth possible implementation manner, the information about the user permission further includes a user behavior; and the allocating the determined user permission to the user includes allocating a determined user behavior to the user, where more user permissions allocated to the user indicate a larger quantity of user behaviors, and fewer user permissions allocated to the user indicate a smaller quantity of user behaviors.

With reference to the possible implementation manner of the first aspect of the present disclosure, in a ninth possible implementation manner, the information about the user permission further includes an operating security level that can be obtained by the user; and the allocating the determined user permission to the user includes allocating a determined operating security level that can be obtained by the user to the user, where more user permissions allocated to the user indicate a higher operating security level that can be obtained by the user, and fewer user permissions allocated to the user indicate a lower operating security level that can be obtained by the user.

With reference to the possible implementation manner of the first aspect of the present disclosure, in a tenth possible implementation manner, determining a difference degree of the current facial feature information of the user according to the acquired facial feature information of the user and facial feature information included in stored standard sample information includes comparing the acquired facial feature information of the user and the facial feature information included in the stored standard sample information, and determining the difference degree between the acquired facial feature information of the user and the facial feature information included in the stored standard sample information, where the difference degree is used for representing a difference between an external environment of the acquired facial feature information of the user and an external environment in which the facial feature information included in the stored standard sample information is collected.

With reference to the possible implementation manner of the first aspect of the present disclosure, in an eleventh possible implementation manner, acquiring currently collected facial feature information of a user includes collecting the facial feature information of the user using a sensing device.

According to a second aspect of the present disclosure, a user permission allocation device is provided, including an acquiring module configured to acquire currently collected facial feature information of a user; a determining module configured to determine a difference degree of the current facial feature information of the user according to the facial feature information, which is acquired by the acquiring module, of the user and facial feature information included in stored standard sample information; and an allocation module configured to allocate a user permission to the user according to the difference degree determined by the determining module.

With reference to a possible implementation manner of the second aspect of the present disclosure, in a first possible implementation manner, the allocation module is configured to adjust, according to the difference degree determined by the determining module, a matching threshold corresponding to the standard sample information, and determine a matching degree of the collected facial feature information of the user according to a matching threshold obtained after adjustment; and allocate the user permission to the user according to the matching degree.

With reference to the first possible implementation manner of the second aspect of the present disclosure, in a second possible implementation manner, the allocation module is configured to compare the difference degree with a preset difference threshold; and decrease the matching threshold corresponding to the standard sample information when the difference degree is greater than the preset difference threshold; keep the matching threshold corresponding to the standard sample information unchanged when the difference degree is equal to the preset difference threshold; or increase the matching threshold corresponding to the standard sample information or keep the matching threshold unchanged when the difference degree is less than the preset difference threshold.

With reference to the second possible implementation manner of the second aspect of the present disclosure, in a third possible implementation manner, the allocation module is configured to calculate a difference between the difference degree and the preset difference threshold; determine, according to a preset correspondence between a difference and an adjustment amplitude of a matching threshold, an adjustment amplitude of the matching threshold corresponding to the calculated difference; and decrease the matching threshold corresponding to the standard sample information by the determined adjustment amplitude.

With reference to the second possible implementation manner of the second aspect of the present disclosure, in a fourth possible implementation manner, the allocation module is configured to calculate an absolute value of a difference between the difference threshold and the preset difference threshold; determine, according to a preset correspondence between an absolute value of a difference and an adjustment amplitude of a matching threshold, an adjustment amplitude of the matching threshold corresponding to the calculated absolute value of the difference; and increase the matching threshold corresponding to the standard sample information by the determined adjustment amplitude.

With reference to the second possible implementation manner of the second aspect of the present disclosure, the third possible implementation manner of the second aspect of the present disclosure, or the fourth possible implementation manner of the second aspect of the present disclosure, in a fifth possible implementation manner, the allocation module is configured to determine, according to a preset correspondence between a matching threshold and a matching degree of facial feature information, a matching degree, which corresponds to the matching threshold obtained after adjustment, of the facial feature information as the matching degree of the collected facial feature information of the user.

With reference to the fifth possible implementation manner of the second aspect of the present disclosure, in a sixth possible implementation manner, the allocation module is configured to determine, according to a preset correspondence between a matching degree and a user permission, an obtained user permission corresponding to the matching degree of the collected facial feature information of the user; and allocate the determined user permission to the user, where a higher matching degree indicates more user permissions allocated to the user, and a lower matching degree indicates fewer user permissions allocated to the user.

With reference to the possible implementation manner of the second aspect of the present disclosure, in a seventh possible implementation manner, information about the user permission includes a validity period of the user permission; and the allocation module is configured to allocate a determined validity period of the user permission to the user, where more user permissions allocated to the user indicate a longer validity period of the user permissions, and fewer user permissions allocated to the user indicate a shorter validity period of the user permissions.

With reference to the possible implementation manner of the second aspect of the present disclosure, in an eighth possible implementation manner, the information about the user permission further includes a user behavior; and the allocation module is configured to allocate a determined user behavior to the user, where more user permissions allocated to the user indicate a larger quantity of user behaviors, and fewer user permissions allocated to the user indicate a smaller quantity of user behaviors.

With reference to the possible implementation manner of the second aspect of the present disclosure, in a ninth possible implementation manner, the information about the user permission further includes an operating security level that can be obtained by the user; and the allocation module is configured to allocate a determined operating security level that can be obtained by the user to the user, where more user permissions allocated to the user indicate a higher operating security level that can be obtained by the user, and fewer user permissions allocated to the user indicate a lower operating security level that can be obtained by the user.

With reference to the possible implementation manner of the second aspect of the present disclosure, in a tenth possible implementation manner, the determining module is configured to compare the acquired facial feature information of the user and the facial feature information included in the stored standard sample information, and determine the difference degree between the acquired facial feature information of the user and the facial feature information included in the stored standard sample information, where the difference degree is used for representing a difference between an external environment of the acquired facial feature information of the user and an external environment in which the facial feature information included in the stored standard sample information is collected.

With reference to the possible implementation manner of the second aspect of the present disclosure, in an eleventh possible implementation manner, the acquiring module is configured to collect the facial feature information of the user using a sensing device.

According to a third aspect of the present disclosure, a user permission allocation device is provided, including a signal receiver configured to acquire currently collected facial feature information of a user; and a processor configured to determine a difference degree of the current facial feature information of the user according to the acquired facial feature information of the user and facial feature information included in stored standard sample information; and allocate a user permission to the user according to the determined difference degree.

With reference to a possible implementation manner of the third aspect of the present disclosure, in a first possible implementation manner, the processor is configured to adjust, according to the determined difference degree, a matching threshold corresponding to the standard sample information, and determine a matching degree of the collected facial feature information of the user according to a matching threshold obtained after adjustment; and allocate the user permission to the user according to the matching degree.

With reference to the first possible implementation manner of the third aspect of the present disclosure, in a second possible implementation manner, the processor is configured to compare the difference degree with a preset difference threshold; and decrease the matching threshold corresponding to the standard sample information when the difference degree is greater than the preset difference threshold; keep the matching threshold corresponding to the standard sample information unchanged when the difference degree is equal to the preset difference threshold; or increase the matching threshold corresponding to the standard sample information or keep the matching threshold unchanged when the difference degree is less than the preset difference threshold.

With reference to the second possible implementation manner of the third aspect of the present disclosure, in a third possible implementation manner, the processor is configured to calculate a difference between the difference degree and the preset difference threshold; determine, according to a preset correspondence between a difference and an adjustment amplitude of a matching threshold, an adjustment amplitude of the matching threshold corresponding to the calculated difference; and decrease the matching threshold corresponding to the standard sample information by the determined adjustment amplitude.

With reference to the second possible implementation manner of the third aspect of the present disclosure, in a fourth possible implementation manner, the processor is configured to calculate an absolute value of a difference between the difference threshold and the preset difference threshold; determine, according to a preset correspondence between an absolute value of a difference and an adjustment amplitude of a matching threshold, an adjustment amplitude of the matching threshold corresponding to the calculated absolute value of the difference; and increase the matching threshold corresponding to the standard sample information by the determined adjustment amplitude.

With reference to the second possible implementation manner of the third aspect of the present disclosure, the third possible implementation manner of the third aspect of the present disclosure, or the fourth possible implementation manner of the third aspect of the present disclosure, in a fifth possible implementation manner, the processor is configured to determine, according to a preset correspondence between a matching threshold and a matching degree of facial feature information, a matching degree, which corresponds to the matching threshold obtained after adjustment, of the facial feature information as the matching degree of the collected facial feature information of the user.

With reference to the fifth possible implementation manner of the third aspect of the present disclosure, in a sixth possible implementation manner, the processor is configured to determine, according to a preset correspondence between a matching degree and a user permission, an obtained user permission corresponding to the matching degree of the collected facial feature information of the user; and allocate the determined user permission to the user, where a higher matching degree indicates more user permissions allocated to the user, and a lower matching degree indicates fewer user permissions allocated to the user.

With reference to the possible implementation manner of the third aspect of the present disclosure, in a seventh possible implementation manner, information about the user permission includes a validity period of the user permission; and the processor is configured to allocate a determined validity period of the user permission to the user, where more user permissions allocated to the user indicate a longer validity period of the user permissions, and fewer user permissions allocated to the user indicate a shorter validity period of the user permissions.

With reference to the possible implementation manner of the third aspect of the present disclosure, in an eighth possible implementation manner, the information about the user permission further includes a user behavior; and the processor is configured to allocate a determined user behavior to the user, where more user permissions allocated to the user indicate a larger quantity of user behaviors, and fewer user permissions allocated to the user indicate a smaller quantity of user behaviors.

With reference to the possible implementation manner of the third aspect of the present disclosure, in a ninth possible implementation manner, the information about the user permission further includes an operating security level that can be obtained by the user; and the processor is configured to allocate a determined operating security level that can be obtained by the user to the user, where more user permissions allocated to the user indicate a higher operating security level that can be obtained by the user, and fewer user permissions allocated to the user indicate a lower operating security level that can be obtained by the user.

With reference to the possible implementation manner of the third aspect of the present disclosure, in a tenth possible implementation manner, the processor is configured to compare the acquired facial feature information of the user and the facial feature information included in the stored standard sample information, and determine the difference degree between the acquired facial feature information of the user and the facial feature information included in the stored standard sample information, where the difference degree is used for representing a difference between an external environment of the acquired facial feature information of the user and an external environment in which the facial feature information included in the stored standard sample information is collected.

With reference to the possible implementation manner of the third aspect of the present disclosure, in an eleventh possible implementation manner, the signal receiver is configured to collect the facial feature information of the user using a sensing device.

Beneficial effects of the present disclosure are as follows.

According to the embodiments of the present disclosure, currently collected facial feature information of a user is acquired; a difference degree of the current facial feature information of the user is determined according to the acquired facial feature information of the user and facial feature information included in stored standard sample information; and a user permission is allocated to the user according to the determined difference degree. Compared with a manner of using a fixed threshold in a current technology, a difference degree of current facial feature information of the user is determined, and when a user permission is allocated to the user, an external factor that affects the collected facial feature information is used as a reference factor, which means that a higher difference degree of the collected facial feature information indicates a lower user permission allocated to the user, so that the user permission of the user is dynamically allocated, not only can a problem of low authentication efficiency be effectively avoided, but also a problem of poor authentication security is avoided, and authentication reliability of a facial recognition technology is effectively improved.

DETAILED DESCRIPTION

In order to achieve an objective of the present disclosure, embodiments of the present disclosure provide a user permission allocation method and device. Currently collected facial feature information of a user is acquired; a difference degree of the current facial feature information of the user is determined according to the acquired facial feature information of the user and facial feature information included in stored standard sample information; and a user permission is allocated to the user according to the determined difference degree. Compared with a manner of using a fixed face threshold in a current technology, a difference degree of the current facial feature information of the user is determined, and when a user permission is allocated to the user, an external factor that affects the collected facial feature information is used as a reference factor, which means that a higher difference degree of the collected facial feature information indicates a lower user permission allocated to the user, so that the user permission of the user is dynamically allocated, a problem of low authentication efficiency is effectively avoided, and a problem of poor authentication security can also be avoided, and authentication reliability of a facial recognition technology is effectively improved.

The following describes the embodiments of the present disclosure in detail with reference to the accompanying drawings in this specification. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Embodiment 1

Figure 1:
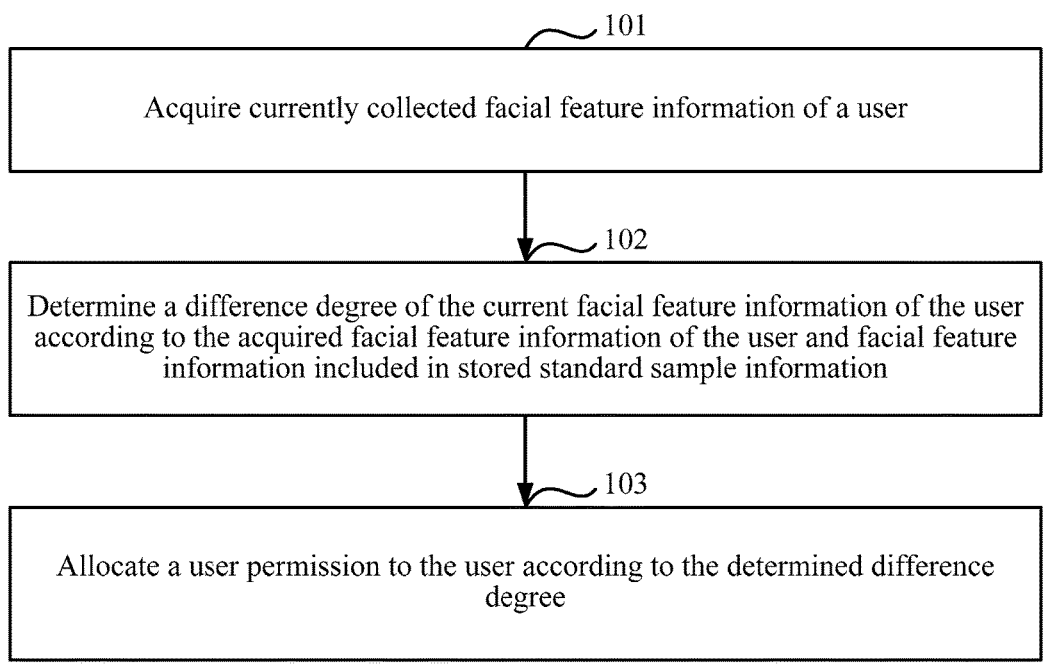
FIG. 1 is a schematic flowchart of a user permission allocation method according to Embodiment 1 of the present disclosure.

FIG. 1 is a schematic flowchart of a user permission allocation method according to Embodiment 1 of the present disclosure. The method may be described as follows.

Step 101: Acquire currently collected facial feature information of a user.

In step 101, a manner of collecting the facial feature information of the user includes, but is not limited to, collecting the current facial feature information of the user using a sensing device.

The facial feature information includes at least facial feature state information (such as expression information), external environment information when collection is performed, and collection state information.

The sensing device includes, but is not limited to, a light sensing device, an image shooting device, a motion sensing device, and the like.

The facial feature state information, such as facial expression information, information about covering on a face, and collection angle information, of the user is collected using the image shooting device; and the external environment information and the collection state information during face authentication are collected using an environment sensing device, for example, current illumination information is collected using the light sensing device; state information (for example, being stationary or in motion) of a current user is collected using the motion sensing device.

It should be noted that, the facial feature information, which is collected using the sensing device, of the user may be image information including a facial feature, or may be dynamic facial feature information within a period of time, which is not limited herein.

After the image information including the facial feature of the user is collected using the sensing device, the facial feature information is extracted from the obtained image information.

Step 102: Determine a difference degree of the current facial feature information of the user according to the acquired facial feature information of the user and facial feature information included in stored standard sample information.

The difference degree is used for representing a difference between an external environment of the acquired facial feature information of the user and an external environment in which the facial feature information included in the stored standard sample information is collected.

In step 102, the standard sample information may be stored in a facial feature information database, or may be stored in a storage device of a facial recognition system, which is not limited herein.

It should be noted that, the facial feature information database may be an electronic storage device, or may be a storage device in a cloud server, which is not limited herein either.

The facial feature information database is configured to collect facial data information of a user when the user registers, extract a facial feature using a facial feature information model, and generate standard sample information of facial feature information of the user, and then store the standard sample information.

It should be noted that, the facial feature information database may further store an association relationship between identification information of the user and the standard sample information of the facial feature information of the user.

When identity authentication is performed using a facial recognition technology, a degree of a difference of the acquired facial feature information from the facial feature information in the stored standard sample information is calculated using the acquired facial feature information of the user and the stored standard sample information.

For example, when facial feature information of a user is acquired, standard sample information of the user is found from the facial feature information database using identification information of the user, the acquired facial feature information is compared with facial feature information included in the found standard sample information, and a degree of a difference of the acquired facial feature information from the facial feature information in the found standard sample information is calculated.

Because the acquired facial feature information of the user is affected by an external factor, different external environments have different impacts on the acquired facial feature information. In this case, for a same user, facial feature information collected in different external environments is also different, and the difference degree, which is calculated according to the acquired facial feature information of the user and the facial feature information included in the stored standard sample information, of the current facial feature information of the user is also different.

That is, the external factor on the acquired facial feature information of the user being closer to an external factor on the stored standard sample information means that a difference degree between the acquired facial feature information and the stored standard sample information is lower.

It should be noted that the calculated difference degree may be a numerical value, may be an interval, or may be a range. A manner of expressing the difference degree is not further limited herein.

Step 103: Allocate a user permission to the user according to the determined difference degree.

In step 103, the allocating a user permission to the user according to the determined difference degree includes adjusting, according to the determined difference degree, a matching threshold corresponding to the standard sample information, and determining a matching degree of the collected facial feature information of the user according to a matching threshold obtained after adjustment; and allocating the user permission to the user according to the matching degree.

The adjusting, according to the determined difference degree, a matching threshold corresponding to the standard sample information includes comparing the difference degree with a preset difference threshold; and decreasing the matching threshold corresponding to the standard sample information when the difference degree is greater than the preset difference threshold; keeping the matching threshold corresponding to the standard sample information unchanged when the difference degree is equal to the preset difference threshold; or increasing the matching threshold corresponding to the standard sample information or keeping the matching threshold unchanged when the difference degree is less than the preset difference threshold.

It should be noted that, when the standard sample information is collected, a system generates, according to the collected standard sample information, a matching threshold corresponding to the standard sample information, where the matching threshold may also be referred to as an initial matching threshold, that is, if the standard sample information is different, the initial matching threshold is also different.

The decreasing the matching threshold when the difference degree is greater than the preset difference threshold includes calculating a difference between the difference degree and the preset difference threshold; and determining, according to a preset correspondence between a difference and an adjustment amplitude of a matching threshold, an adjustment amplitude of the matching threshold corresponding to the calculated difference; and decreasing the initial matching threshold by the determined adjustment amplitude.

For example, when the calculated difference is ranges from 0 to 0.1, the adjustment amplitude of the corresponding matching threshold is a1, and the initial matching threshold is decreased by a1; when the calculated difference is between 0.1 and 0.3, the adjustment amplitude of the corresponding matching threshold is a2, and the initial matching threshold is decreased by a2; . . . ; and when the calculated difference is between 0.9 and 1, the adjustment amplitude of the corresponding matching threshold is aN, and the initial matching threshold is decreased by aN.

The increasing, when the difference degree is less than the preset difference threshold, the preset matching threshold includes calculating an absolute value of a difference between the difference threshold and the preset difference threshold; determining, according to a preset correspondence between an absolute value of a difference and an adjustment amplitude of a matching threshold, an adjustment amplitude of the matching threshold corresponding to the calculated absolute value of the difference; and increasing the preset matching threshold by the determined adjustment amplitude.

For example, when the calculated absolute value of the difference is ranges from 0 to 0.1, the adjustment amplitude of the corresponding matching threshold is a1, and the initial matching threshold is increased by a1; when the calculated difference is between 0.1 and 0.3, the adjustment amplitude of the corresponding matching threshold is a2, and the initial matching threshold is increased by a2; . . . ; and when the calculated difference is between 0.9 and 1, the adjustment amplitude of the corresponding matching threshold is aN, and the initial matching threshold is increased by aN.

The determining a matching degree of the collected facial feature information of the user according to a matching threshold obtained after adjustment includes determining, according to a preset correspondence between a matching threshold and a matching degree of facial feature information, a matching degree, which corresponds to the matching threshold obtained after adjustment, of the facial feature information as the matching degree of the collected facial feature information of the user.

For example, Table 1 shows a list of the preset correspondence between matching thresholds and matching degrees of facial feature information.

TABLE 1

| Matching threshold | Matching degree of facial feature information |
|---|---|
| 0 to 0.1 | 10% |
| 0.3 to 0.4 | 30% |
| 0.4 to 0.5 | 50% |
| 0.6 to 0.7 | 70% |
| 0.9 to 1 | 90% |

It can be seen from Table 1 that, as the matching threshold increases, the matching degree of the facial feature information gradually increases; in contrast, when the matching threshold is the minimum, the matching degree of the facial feature is the lowest.

The allocating the user permission to the user according to the matching degree includes determining, according to a preset correspondence between a matching degree and a user permission, an obtained user permission corresponding to the matching degree of the collected facial feature information of the user; and allocating the determined user permission to the user.

A higher matching degree indicates more user permissions allocated to the user, and a lower matching degree indicates fewer user permissions allocated to the user.

It should be noted that, a matching level may be further determined according to the matching degree, and a user permission to be allocated to the user is further determined according to a correspondence between a matching level and a user permission.

N matching levels may be set, and each matching level corresponds to one matching degree. A larger value of the matching degree indicates a smaller numerical value of a corresponding matching level; in contrast, a smaller value of the matching degree indicates a larger numerical value of a corresponding matching level.

It should be noted that, a correspondence between a matching level and a matching degree is not limited to the foregoing expression manner, and the correspondence may be determined according to experimental data, or may be determined according to needs of the facial recognition technology, which is not limited herein.

When information about the user permission includes a validity period of the user permission and a user behavior, duration, which corresponds to different user permissions, for using the user permissions is different, where a higher user permission indicates a longer validity period of the user permission; in contrast, a lower user permission indicates a shorter validity period of the user permission.

User behaviors corresponding to different user permissions are different, where a higher user permission indicates a larger quantity of user behaviors; on the contrary, a lower user permission indicates a smaller quantity of user behaviors.

In addition, a determined security level corresponding to the matching degree is obtained according to a preset correspondence between a matching degree and a security level, and the determined security level is allocated to the user.

The security level is used for representing a security protection level obtained when the user uses a terminal device.

A security level corresponding to a larger value of a matching degree is higher than a security level corresponding to a smaller value of a matching degree.

For example, the security level includes an authentication level (which is classified into the following levels: authentication fails, authentication succeeds, authentication succeeds and a call is allowed, and the like).

According to the solution of Embodiment 1 of the present disclosure, currently collected facial feature information of a user is acquired; a difference degree of the current facial feature information of the user is determined according to the acquired facial feature information of the user and facial feature information included in stored standard sample information; and a user permission is allocated to the user according to the determined difference degree. Compared with a manner of using a fixed face threshold in a current technology, a difference degree of current facial feature information of the user is determined, and when a user permission is allocated to the user, an external factor that affects the collected facial feature information is used as a reference factor, which means that a higher difference degree of the collected facial feature information indicates a lower user permission allocated to the user, so that the user permission of the user is dynamically allocated, not only can a problem of low authentication efficiency be effectively avoided, but also a problem of poor authentication security is avoided, and authentication reliability of a facial recognition technology is effectively improved.

Embodiment 2

Figure 2:
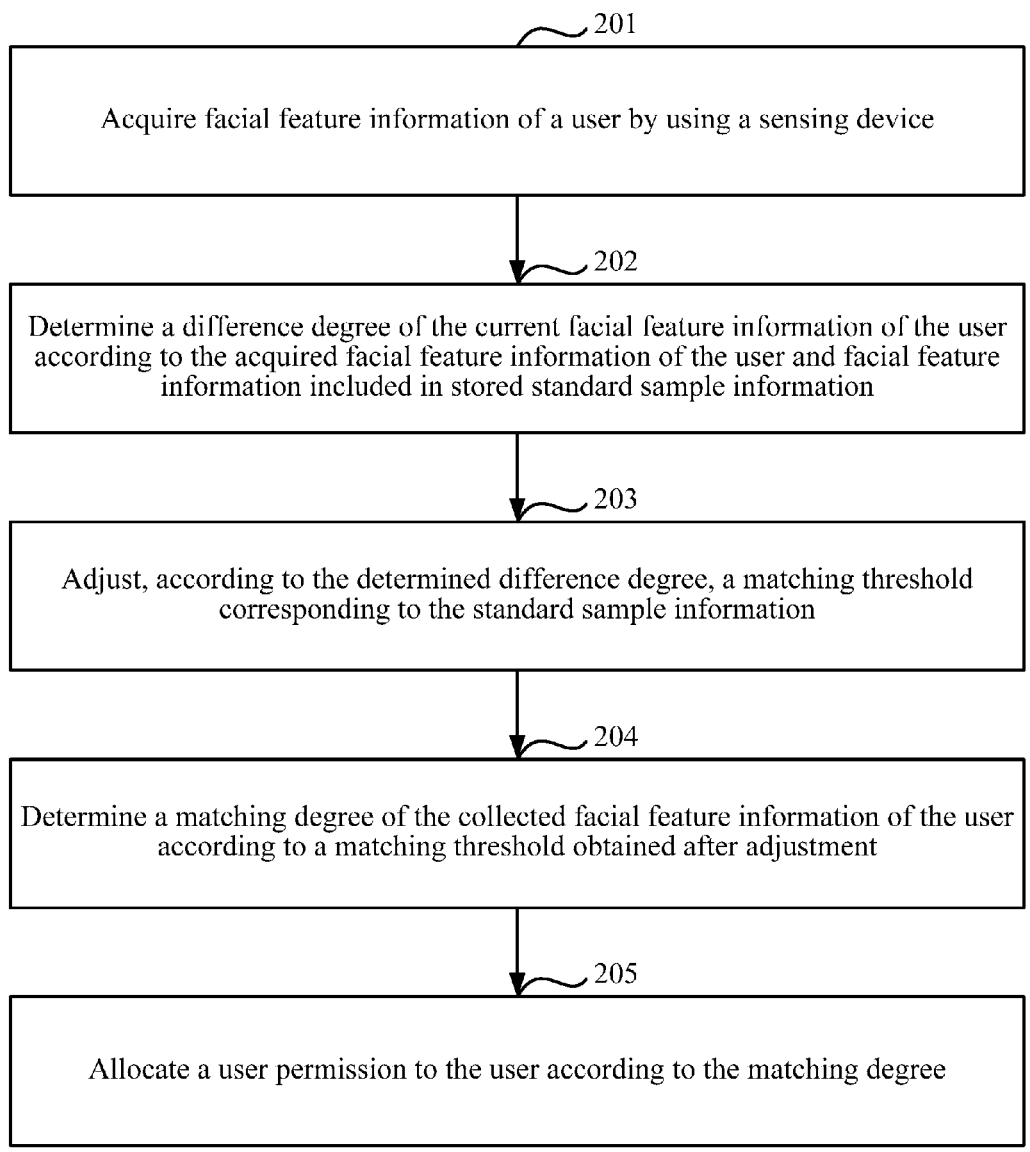
FIG. 2 is a schematic flowchart of a user permission allocation method according to Embodiment 2 of the present disclosure.

FIG. 2 is a schematic flowchart of a user permission allocation method according to Embodiment 2 of the present disclosure. The method may be described as follows.

Step 201: Acquire facial feature information of a user using a sensing device.

The facial feature information includes facial feature state information, external environment information when collection is performed, and collection state information.

In step 201, the facial feature state information includes facial expression information, and collection angle information of a face, information about whether a hat or glasses are worn, and the like.

The external environment information includes illumination range information, illumination intensity information, chrominance information used in shooting, and the like.

The collection state information includes information of being in a stationary state, information of being in a motion state, information of being in a parallel movement state, information of being in a jitter state, and the like.

It should be noted that, the facial feature information is acquired using the sensing device, and because external factors such as shooting scenarios, shooting times, and states of the user during shooting are different, the facial feature information acquired for the same user is different.

Step 202: Determine a difference degree of the current facial feature information of the user according to the acquired facial feature information of the user and facial feature information included in stored standard sample information.

The difference degree is used for representing a non-similarity between a facial feature in the acquired facial feature information of the user and a facial feature in the facial feature information included in the stored standard sample information.

In step 202, because the acquired facial feature information of the user is affected by an external factor, a difference degree, which is calculated using the acquired facial feature information and the stored standard sample information, between the acquired facial feature information and the stored standard sample information is also different.

That is, the external factor on the acquired facial feature information of the user being closer to an external factor on the stored standard sample information means that a difference degree between the acquired facial feature information and the stored standard sample information is lower.

It should be noted that the calculated difference degree may be a numerical value, may be an interval, or may be a range. A manner of expressing the difference degree is not further limited herein.

Step 203: Adjust, according to the determined difference degree, a matching threshold corresponding to the standard sample information.

In step 203, the adjusting, according to the determined difference degree, a matching threshold corresponding to the standard sample information includes comparing the difference degree with a preset difference threshold; and decreasing, the matching threshold corresponding to the standard sample information when the difference degree is greater than the preset difference threshold; keeping the matching threshold corresponding to the standard sample information unchanged when the difference degree is equal to the preset difference threshold; or increasing the matching threshold corresponding to the standard sample information or keeping the matching threshold unchanged when the difference degree is less than the preset difference threshold.

It should be noted that, when the standard sample information is collected, a system generates, according to the collected standard sample information, a matching threshold corresponding to the standard sample information, where the matching threshold may also be referred to as an initial matching threshold, that is, if the standard sample information is different, the initial matching threshold is also different.

The decreasing the preset matching threshold when the difference degree is greater than the preset difference threshold includes calculating a difference between the difference degree and the preset difference threshold; and determining, according to a preset correspondence between a difference and an adjustment amplitude of a matching threshold, an adjustment amplitude of the matching threshold corresponding to the calculated difference; and decreasing the initial matching threshold by the determined adjustment amplitude.

The increasing, when the difference degree is less than the preset difference threshold, the preset matching threshold includes calculating an absolute value of a difference between the difference threshold and the preset difference threshold; determining, according to a preset correspondence between an absolute value of a difference and an adjustment amplitude of a matching threshold, an adjustment amplitude of the matching threshold corresponding to the calculated absolute value of the difference; and increasing the preset matching threshold by the determined adjustment amplitude.

Step 204: Determine a matching degree of the collected facial feature information of the user according to a matching threshold obtained after adjustment.

In step 204, it is determined, according to a preset correspondence between a matching threshold and a matching degree of facial feature information, a matching degree, which corresponds to the matching threshold obtained after adjustment, of the facial feature information as the matching degree of the collected facial feature information of the user.

Step 205: Allocate a user permission to the user according to the matching degree.

In step 205, an obtained user permission corresponding to the matching degree of the collected facial feature information of the user is determined according to a preset correspondence between a matching degree and a user permission; and the determined user permission is allocated to the user.

A higher matching degree indicates more user permissions allocated to the user, and a lower matching degree indicates fewer user permissions allocated to the user.

It should be noted that, a matching level may be further determined according to the matching degree, and a user permission to be allocated to the user is further determined according to a correspondence between a matching level and a user permission.

N matching levels may be set, and each matching level corresponds to one matching degree. A larger value of the matching degree indicates a smaller numerical value of a corresponding matching level; in contrast, a smaller value of the matching degree indicates a larger numerical value of a corresponding matching level.

It should be noted that, a correspondence between a matching level and a matching degree is not limited to the foregoing expression manner, and the correspondence may be determined according to experimental data, or may be determined according to needs of a facial recognition technology, which is not limited herein.

In addition, a determined security level corresponding to the matching degree is obtained according to a preset correspondence between a matching degree and a security level.

When the determined security level corresponding to the matching degree is low, in order to avoid a security threat, facial feature authentication of the user can be rejected, or the user permission of the user is limited.

The user permission includes a validity period of the user permission and a user behavior.

For the validity period of the user permission, a higher matching degree indicates more user permissions allocated to the user and a longer validity period of user permission allocated to the user, which means that a validity period of a user permission with a high matching degree may be prolonged or the validity period of the user permission is kept unchanged; in contrast, a lower matching degree indicates fewer user permissions allocated to the user and a shorter validity period of the user permission allocated to the user, which means that the validity period of the user permission may be shortened.

For example, the determined matching degree of the user is classified into 10 levels, which are a level 0 to a level 9. The matching degree of the user being the level 0 means that the validity period of the user permission of the user is the longest; and the matching degree of the user being the level 9 means that the validity period of the user permission of the user is the shortest.

Assuming that the validity period of the user permission of the user is 5 s by default, and a corresponding matching degree of the user is the level 5, when the determined matching degree of the user is the level 1, the validity period of the user permission needs to be prolonged to a validity period of a user permission corresponding to the matching degree of the user being the level 1, and when use duration of the user exceeds the validity period of the user permission corresponding to the matching degree of the user being the level 1, a default validity period of the user permission is resumed; and when the determined matching degree of the user is the level 8, the validity period of the user permission needs to be shortened to a validity period of a user permission corresponding to the matching degree of the user being the level 8, and when the use duration of the user exceeds the validity period of the user permission corresponding to the matching degree of the user being the level 8, the default validity period of the user permission is resumed.

For the user behavior, a higher matching degree indicates more user permissions allocated to the user and a larger quantity of user behaviors, which means that a quantity of user behaviors that can be performed by the user may be increased; and a lower matching degree indicates fewer user permissions allocated to the user and a smaller quantity of user behaviors, which means that the quantity of user behaviors that can be performed by the user may be decreased.

It should be noted that the user behavior includes a behavior of performing a setting by a user, a permission of a behavior that a user can use an application, a permission of a behavior of performing a communication operation by a user, and the like.

For example, a behavior that a user creates, reads, or writes various objects, such as a file, an application program, hardware, a function in a system, and performs an operation on an attribute of a behavior.

Assuming that the matching degree is expressed using three levels, which are a low level, a medium level, and a high level, determined user behaviors for different matching degrees are also different.

Table 2 shows a correspondence between a matching degree and a user behavior.

TABLE 2

| Matching degree | User behavior |
| --- | --- |
| Low | Setting display, sound, a date, and the like |
| Medium | Setting a network, storage, and the like |
| High | Setting privacy, a password, and the like |

Table 3 shows a correspondence between a matching degree and a permission of a behavior that a user can use an application.

TABLE 3

| Matching degree | Permission of a behavior that a user can use an application |
| --- | --- |
| Low | Internet surfing, taking a picture, playing games, and the like |
| Medium | A contact list, a gallery, a phone call, a short message service message, an E-mail, a social network, and the like |
| High | Payment and notes |

Table 4 shows a correspondence between a matching degree and a permission of a behavior of performing a communication operation by a user.

TABLE 4

| Matching degree | Information about a permission of a behavior of performing a communication operation by a user |
| --- | --- |
| Low | A video call, a voice call, and the like |
| Medium | A short message service message and the like |
| High | A social network and the like |

For example, the determined matching degree is classified into 10 levels, which are the level 0 to the level 9. The matching degree being the level 0 means that a quantity of behaviors, which can be performed by the user, of user permissions is the largest; and the matching degree being the level 9 means that the quantity of behaviors, which can be performed by the user, of user permissions is the smallest.

Assuming that a user behavior of the user corresponds, by default, to a user behavior corresponding to the matching degree being "medium" in Table 2 to Table 4, when the determined matching degree is "low", the user behavior of the user is lowered to a user behavior corresponding to the matching degree being "low"; and when the determined matching degree is "high", the user behavior of the user is raised to a user behavior corresponding to the matching degree being "high".

It should be noted that, after the user permission of the user is determined, when the user wants to execute a permission except the determined user permission, the user may be directly rejected, or the user may be required to perform face authentication or perform further authentication in other authentication manners.

A difference degree of current facial feature information of the user is determined, and when a user permission is allocated to the user, an external factor that affects the collected facial feature information is used as a reference factor, which means that a higher difference degree of the collected facial feature information indicates a lower user permission allocated to the user, so that the user permission of the user is dynamically allocated, not only can a problem of low authentication efficiency be effectively avoided, but also a problem of poor authentication security is avoided, and authentication reliability of a facial recognition technology is effectively improved.

Embodiment 3

Figure 3:
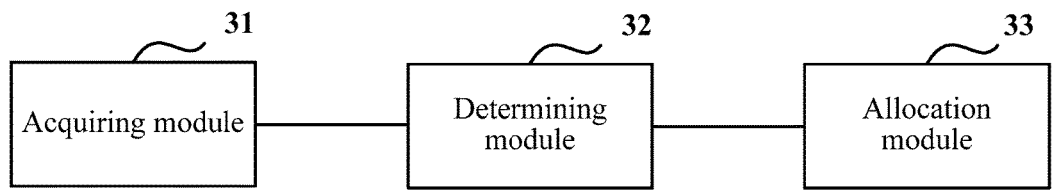
FIG. 3 is a schematic structural diagram of a user permission allocation device according to Embodiment 3 of the present disclosure.

FIG. 3 is a schematic structural diagram of a user permission allocation device according to Embodiment 3 of the present disclosure. The device includes an acquiring module 31, a determining module 32, and an allocation module 33.

The acquiring module 31 is configured to acquire currently collected facial feature information of a user.

The determining module 32 is configured to determine a difference degree of the current facial feature information of the user according to the facial feature information, which is acquired by the acquiring module, of the user and facial feature information included in stored standard sample information.

The allocation module 33 is configured to allocate a user permission to the user according to the difference degree determined by the determining module.

The allocation module 33 is configured to adjust, according to the difference degree determined by the determining module, a matching threshold corresponding to the standard sample information, and determine a matching degree of the collected facial feature information of the user according to a matching threshold obtained after adjustment; and allocate the user permission to the user according to the matching degree.

The allocation module 33 is configured to compare the difference degree with a preset difference threshold; and decrease the matching threshold corresponding to the standard sample information when the difference degree is greater than the preset difference threshold; keep the matching threshold corresponding to the standard sample information unchanged when the difference degree is equal to the preset difference threshold; or increase the matching threshold corresponding to the standard sample information or keep the matching threshold unchanged when the difference degree is less than the preset difference threshold.

The allocation module 33 is configured to calculate a difference between the difference degree and the preset difference threshold; determine, according to a preset correspondence between a difference and an adjustment amplitude of a matching threshold, an adjustment amplitude of the matching threshold corresponding to the calculated difference; and decrease the matching threshold corresponding to the standard sample information by the determined adjustment amplitude.

The allocation module 33 is configured to calculate an absolute value of a difference between the difference threshold and the preset difference threshold; determine, according to a preset correspondence between an absolute value of a difference and an adjustment amplitude of a matching threshold, an adjustment amplitude of the matching threshold corresponding to the calculated absolute value of the difference; and increase the matching threshold corresponding to the standard sample information by the determined adjustment amplitude.

The allocation module 33 is configured to determine, according to a preset correspondence between a matching threshold and a matching degree of facial feature information, a matching degree, which corresponds to the matching threshold obtained after adjustment, of the facial feature information as the matching degree of the collected facial feature information of the user.

The allocation module 33 is configured to determine, according to a preset correspondence between a matching degree and a user permission, an obtained user permission corresponding to the matching degree of the collected facial feature information of the user; and allocate the determined user permission to the user, where a higher matching degree indicates more user permissions allocated to the user, and a lower matching degree indicates fewer user permissions allocated to the user.

In another embodiment of the present disclosure, information about the user permission includes a validity period of the user permission; and the allocation module 33 is configured to allocate a determined validity period of the user permission to the user, where more user permissions allocated to the user indicate a longer validity period of the user permissions, and fewer user permissions allocated to the user indicate a shorter validity period of the user permissions.

In another embodiment of the present disclosure, the information about the user permission further includes a user behavior; and the allocation module 33 is configured to allocate a determined user behavior to the user, where more user permissions allocated to the user indicate a larger quantity of user behaviors, and fewer user permissions allocated to the user indicate a smaller quantity of user behaviors.

In another embodiment of the present disclosure, the information about the user permission further includes an operating security level that can be obtained by the user; and the allocation module 33 is configured to allocate a determined operating security level that can be obtained by the user to the user, where more user permissions allocated to the user indicate a higher operating security level that can be obtained by the user, and fewer user permissions allocated to the user indicate a lower operating security level that can be obtained by the user.

In another embodiment of the present disclosure, the determining module 32 is configured to compare the acquired facial feature information of the user and the facial feature information included in the stored standard sample information, and determine the difference degree between the acquired facial feature information of the user and the facial feature information included in the stored standard sample information, where the difference degree is used for representing a difference between an external environment of the acquired facial feature information of the user and an external environment in which the facial feature information included in the stored standard sample information is collected.

In another embodiment of the present disclosure, the acquiring module 31 is configured to collect the facial feature information of the user using a sensing device.

It should be noted that, the device provided by this embodiment of the present disclosure may be implemented by hardware, or may be implemented by software, which is not limited herein.

The allocation device in this embodiment of the present disclosure determines a difference degree of current facial feature information of the user, and when allocating a user permission to the user, uses an external factor that affects the collected facial feature information as a reference factor, which means that a higher difference degree of the collected facial feature information indicates a lower user permission allocated to the user, so that the user permission of the user is dynamically allocated, not only can a problem of low authentication efficiency be effectively avoided, but also a problem of poor authentication security is avoided, and authentication reliability of a facial recognition technology is effectively improved.

Embodiment 4

Figure 4:
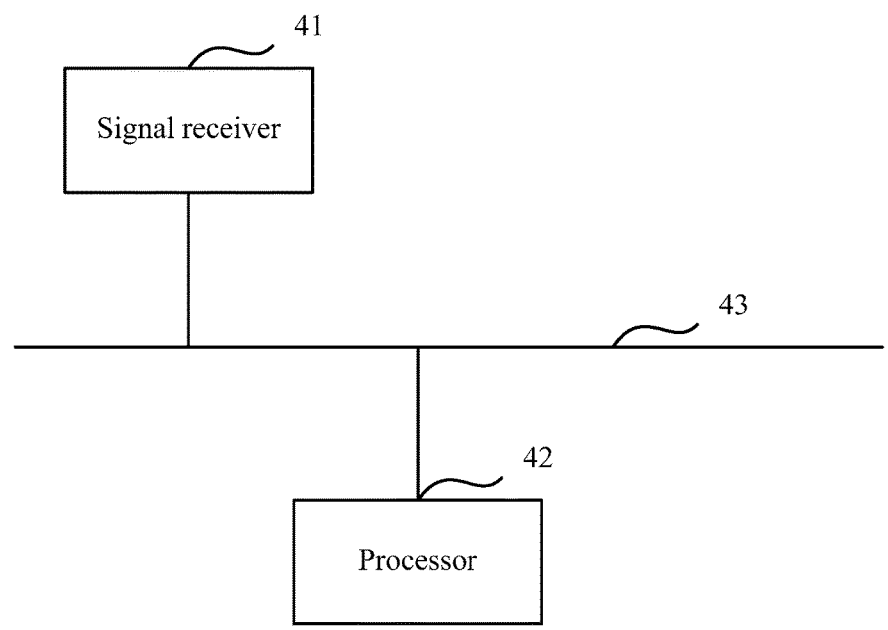
FIG. 4 is a schematic structural diagram of a user permission allocation device according to Embodiment 4 of the present disclosure.

FIG. 4 is a schematic structural diagram of a user permission allocation device according to Embodiment 4 of the present disclosure. The allocation device has a function of performing Embodiment 1 of the present disclosure to Embodiment 3 of the present disclosure. The allocation device may use a general-purpose computer system structure, and a computer system may be a computer based on a processor. The allocation device entity includes a signal receiver 41 and at least one processor 42. The signal receiver 41 and the processor 42 are connected using a communications bus 43.

The signal receiver 41 is configured to acquire currently collected facial feature information of a user.

The processor 42 is configured to determine a difference degree of the current facial feature information of the user according to the acquired facial feature information of the user and facial feature information included in stored standard sample information; and allocate a user permission to the user according to the determined difference degree.

In an embodiment of the present disclosure, the processor 42 is configured to adjust, according to the determined difference degree, a matching threshold corresponding to the standard sample information, and determine a matching degree of the collected facial feature information of the user according to a matching threshold obtained after adjustment; and allocate the user permission to the user according to the matching degree.

In an embodiment of the present disclosure, the processor 42 is configured to compare the difference degree with a preset difference threshold; and decrease the matching threshold corresponding to the standard sample information when the difference degree is greater than the preset difference threshold; keep the matching threshold corresponding to the standard sample information unchanged when the difference degree is equal to the preset difference threshold; or increase the matching threshold corresponding to the standard sample information or keep the matching threshold unchanged when the difference degree is less than the preset difference threshold.

In an embodiment of the present disclosure, the processor 42 is configured to calculate a difference between the difference degree and the preset difference threshold; determine, according to a preset correspondence between a difference and an adjustment amplitude of a matching threshold, an adjustment amplitude of the matching threshold corresponding to the calculated difference; and decrease the matching threshold corresponding to the standard sample information by the determined adjustment amplitude.

In an embodiment of the present disclosure, the processor 42 is configured to calculate an absolute value of a difference between the difference threshold and the preset difference threshold; determine, according to a preset correspondence between an absolute value of a difference and an adjustment amplitude of a matching threshold, an adjustment amplitude of the matching threshold corresponding to the calculated absolute value of the difference; and increase the matching threshold corresponding to the standard sample information by the determined adjustment amplitude.

In an embodiment of the present disclosure, the processor 42 is configured to determine, according to a preset correspondence between a matching threshold and a matching degree of facial feature information, a matching degree, which corresponds to the matching threshold obtained after adjustment, of the facial feature information as the matching degree of the collected facial feature information of the user.

In an embodiment of the present disclosure, the processor 42 is configured to determine, according to a preset correspondence between a matching degree and a user permission, an obtained user permission corresponding to the matching degree of the collected facial feature information of the user; and allocate the determined user permission to the user, where a higher matching degree indicates more user permissions allocated to the user, and a lower matching degree indicates fewer user permissions allocated to the user.

In an embodiment of the present disclosure, information about the user permission includes a validity period of the user permission; and the processor 42 is configured to allocate a determined validity period of the user permission to the user, where more user permissions allocated to the user indicate a longer validity period of the user permissions, and fewer user permissions allocated to the user indicate a shorter validity period of the user permissions.

In an embodiment of the present disclosure, the information about the user permission further includes a user behavior; and the processor 42 is configured to allocate a determined user behavior to the user, where more user permissions allocated to the user indicate a larger quantity of user behaviors, and fewer user permissions allocated to the user indicate a smaller quantity of user behaviors.

In an embodiment of the present disclosure, the information about the user permission further includes an operating security level that can be obtained by the user; and the processor 42 is configured to allocate a determined operating security level that can be obtained by the user to the user, where more user permissions allocated to the user indicate a higher operating security level that can be obtained by the user, and fewer user permissions allocated to the user indicate a lower operating security level that can be obtained by the user.

In an embodiment of the present disclosure, the processor 42 is configured to compare the acquired facial feature information of the user and the facial feature information included in the stored standard sample information, and determine the difference degree between the acquired facial feature information of the user and the facial feature information included in the stored standard sample information, where the difference degree is used for representing a difference between an external environment of the acquired facial feature information of the user and an external environment in which the facial feature information included in the stored standard sample information is collected.

In an embodiment of the present disclosure, the signal receiver is configured to collect the facial feature information of the user using a sensing device.

The processor 42 may be a general central processing unit (CPU), a microprocessor, an application-specific integrated circuit (ASIC), or one or more integrated circuits configured to control execution of a program in the solutions of the present disclosure.

The allocation device in this embodiment of the present disclosure determines a difference degree of current facial feature information of the user, and when allocating a user permission to the user, uses an external factor that affects the collected facial feature information as a reference factor, which means that a higher difference degree of the collected facial feature information indicates a lower user permission allocated to the user, so that the user permission of the user is dynamically allocated, not only can a problem of low authentication efficiency be effectively avoided, but also a problem of poor authentication security is avoided, and authentication reliability of a facial recognition technology is effectively improved.

Persons skilled in the art should understand that the embodiments of the present disclosure may be provided as a method, an apparatus (a device), or a computer program product. Therefore, the present disclosure may use a form of a complete hardware embodiment, a complete software embodiment, or an embodiment combining software and hardware. Moreover, the present disclosure may use a form of a computer program product that is implemented on one or more computer-usable storage media (including, but not limited to, a disk memory, a compact disc read-only memory (CD-ROM), an optical memory, and the like) that include computer-usable program code.

The present disclosure is described with reference to the flowcharts and/or the block diagrams of the method, the apparatus (the device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided to a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may also be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

Although exemplary embodiments of the present disclosure have been described, persons skilled in the art can make changes and modifications to these embodiments once they learn the basic inventive concept. Therefore, the following claims are intended to be construed as to cover the exemplary embodiments and all changes and modifications falling within the scope of the present disclosure.

What is claimed is:

1. A user permission allocation method, comprising:
   acquiring, by a processor, currently collected image information, wherein the image information comprises facial feature information of a user;
   determining, by the processor, a difference degree of the current facial feature information of the user according to the acquired facial feature information of the user and facial feature information comprised in stored standard sample information;
   adjusting, by the processor, according to the determined difference degree, a matching threshold corresponding to the standard sample information by: information;
   comparing the difference degree with a preset difference threshold;
   decreasing the matching threshold corresponding to the standard sample information when the difference degree is greater than the preset difference threshold by:
   calculating a difference between the difference degree and the preset difference threshold:
   determining, according to a preset correspondence between the difference and an adjustment amplitude of the matching threshold, an adjustment amplitude of the matching threshold corresponding to the calculated difference; and
   decreasing the matching threshold corresponding to the standard sample information by the determined adjustment amplitude;
   keeping the matching threshold corresponding to the standard sample information unchanged when the difference degree is equal to the preset difference threshold; and
   increasing the matching threshold corresponding to the standard sample information or keeping the matching threshold unchanged when the difference degree is less than the preset difference threshold;
   determining, by the processor, a matching degree of the collected facial feature information of the user according to a matching threshold obtained after adjustment; and
   allocating, by the processor, the user permission to the user according to the matching degree.

2. The user permission allocation method of claim 1, wherein increasing the matching threshold corresponding to the standard sample information when the difference degree is less than the preset difference threshold comprises:

calculating an absolute value of the difference between the difference degree and the preset difference threshold;

determining, according to a preset correspondence between an absolute value of the difference and an adjustment amplitude of the matching threshold, an adjustment amplitude of the matching threshold corresponding to the calculated absolute value of the difference; and increasing the matching threshold corresponding to the standard sample information by the determined adjustment amplitude.

3. The user permission allocation method of claim 1, wherein determining the matching degree of the collected facial feature information of the user according to the matching threshold obtained after adjustment comprises determining, according to a preset correspondence between a matching threshold and a matching degree of facial feature information, a matching degree, which corresponds to the matching threshold obtained after adjustment, of the facial feature information as the matching degree of the collected facial feature information of the user.

4. The user permission allocation method of claim 3, wherein allocating the user permission to the user according to the matching degree comprises:

determining, according to a preset correspondence between a matching degree and a user permission, an obtained user permission corresponding to the matching degree of the collected facial feature information of the user; and allocating the determined user permission to the user, wherein a higher matching degree indicates more user permissions allocated to the user, and a lower matching degree indicates fewer user permissions allocated to the user.

5. The user permission allocation method of claim 1, wherein determining the difference degree of the current facial feature information of the user according to the acquired facial feature information of the user and the facial feature information comprised in the stored standard sample information comprises:

comparing the acquired facial feature information of the user and the facial feature information comprised in the stored standard sample information; and determining the difference degree between the acquired facial feature information of the user and the facial feature information comprised in the stored standard sample information, and wherein the difference degree is used for representing a difference between an external environment of the acquired facial feature information of the user and an external environment in which the facial feature information comprised in the stored standard sample information is collected.

6. A user permission allocation device, comprising:

a non-transitory computer readable medium having instructions stored thereon; and a computer processor coupled to the non-transitory computer readable medium and configured to execute the instructions to:

acquire currently collected image information, wherein the image information comprises facial feature information of a user;

determine a difference degree of the current facial feature information of the user according to the facial feature information, which is acquired by the computer processor, of the user and facial feature information comprised in stored standard sample information;

adjust, according to the difference degree, a matching threshold corresponding to the standard sample information by: information;

comparing the difference degree with a preset difference threshold;

decreasing the matching threshold corresponding to the standard sample information when the difference degree is greater than the preset difference threshold by;

calculating a difference between the difference degree and the preset difference threshold;

determining, according to a preset correspondence between the difference and an adjustment amplitude of the matching threshold, an adjustment amplitude of the matching threshold corresponding to the calculated difference; and decreasing the matching threshold corresponding to the standard sample information by the determined adjustment amplitude;

keeping the matching threshold corresponding to the standard sample information unchanged when the difference degree is equal to the preset difference threshold; and increasing the matching threshold corresponding to the standard sample information or keeping the matching threshold unchanged when the difference degree is less than the preset difference threshold;

determine a matching degree of the collected facial feature information of the user according to a matching threshold obtained after adjustment; and allocate the user permission to the user according to the matching degree.

7. The user permission allocation device of claim 6, wherein the computer processor is further configured to execute the instructions to:

calculate an absolute value of the difference between the difference degree and the preset difference threshold;

determine, according to a preset correspondence between an absolute value of the difference and an adjustment amplitude of the matching threshold, an adjustment amplitude of the matching threshold corresponding to the calculated absolute value of the difference; and increase the matching threshold corresponding to the standard sample information by the determined adjustment amplitude.

8. The user permission allocation device of claim 6, wherein the computer processor is further configured to execute the instructions to determine, according to a preset correspondence between a matching threshold and a matching degree of facial feature information, a matching degree, which corresponds to the matching threshold obtained after adjustment, of the facial feature information as the matching degree of the collected facial feature information of the user.

9. The user permission allocation device of claim 8, wherein the computer processor is further configured to execute the instructions to:

determine, according to a preset correspondence between a matching degree and a user permission, an obtained user permission corresponding to the matching degree of the collected facial feature information of the user; and allocate the determined user permission to the user, wherein a higher matching degree indicates more user permissions allocated to the user, and wherein a lower matching degree indicates fewer user permissions allocated to the user.

10. The user permission allocation device of claim 6, wherein the computer processor is further configured to execute the instructions to:
  compare the acquired facial feature information of the user and the facial feature information comprised in the stored standard sample information; and
  determine the difference degree between the acquired facial feature information of the user and the facial feature information comprised in the stored standard sample information, and
  wherein the difference degree is used for representing a difference between an external environment of the acquired facial feature information of the user and an external environment in which the facial feature information comprised in the stored standard sample information is collected.

11. A non-transitory computer-readable storage medium storing programming instructions for execution by at least one processor, the programming instructions instruct the at least one processor to:
  acquire currently collected image information, wherein the image information comprises facial feature information of a user;
  determine a difference degree of the current facial feature information of the user according to the facial feature information, which is acquired by the computer processor, of the user and facial feature information comprised in stored standard sample information;
  adjust, according to the difference degree, a matching threshold corresponding to the standard sample information by: information;
  comparing the difference degree with a preset difference threshold;
  decreasing the matching threshold corresponding to the standard sample information when the difference degree is greater than the preset difference threshold by:
  calculating a difference between the difference degree and the preset difference threshold;
  determining, according to a preset correspondence between the difference and an adjustment amplitude of the matching threshold, an adjustment amplitude of the matching threshold corresponding to the calculated difference; and
  decreasing the matching threshold corresponding to the standard sample information by the determined adjustment amplitude;
  keeping the matching threshold corresponding to the standard sample information unchanged when the difference degree is equal to the preset difference threshold; and
  increasing the matching threshold corresponding to the standard sample information or keeping the matching threshold unchanged when the difference degree is less than the preset difference threshold;
  determine a matching degree of the collected facial feature information of the user according to the matching threshold obtained after adjustment; and
  allocate the user permission to the user according to the matching degree.

* * * * *